United States Patent Office.

JAMES J. JOHNSTON, OF ALLEGHENY CITY, PENNSYLVANIA.

Letters Patent No. 93,155, dated July 27, 1869.

IMPROVEMENT IN THE MANUFACTURE OF IRON AND STEEL.

The Schedule referred to in these Letters Patent and making part of the same.

*To all whom it may concern:*

Be it known that I, JAMES J. JOHNSTON, of the city and county of Allegheny, and State of Pennsylvania, have invented a new and useful Improvement in the Manufacture of Iron and Steel; and I do hereby declare that the following is a full, clear, and exact description thereof.

The introduction and use of stone-coal, coke, and hot-blast, in the reduction of iron-ore to the metallic state, has occasioned much bad pig-iron, known to the trade as "red-short," "cold-short," and "rotten-short," and this condition of the art being common and extensive, has produced a general desire among manufacturers of iron and steel for some sure, easy, and economical means for removing the impurities in the pig-metal prior to transferring it to the puddling or heating-furnace, and at the same time to lessen the time, labor, and cost of manufacturing it into a good article of wrought-iron or steel.

To accomplish the removal of the impurities in the pig-metal, manufacturers of wrought-iron and steel have had recourse to the bloomery-fires, finery-fires, and forge-fires, in all their varieties. They have also resorted to the use of the "Catalan forge," "German forge," "Wolf's oven," "blue oven," "crucibles," and furnaces in all their varieties. They have also resorted to the puddling, boiling, and granulating-processes, to the use of fluxes and "physic," consisting of metallic oxides, earths, alkaline, saline, and carbonaceous matter in different quantities, and variously combined and compounded. They have also had recourse to gases, acids, water, steam, and air, using them separately and combined, and applied in almost every conceivable manner; but all these agencies have failed to produce the desired result, viz, the purifying and refining of the various kinds of pig-metal, and facilitating and lessening the cost of manufacturing it into a good article of wrought-iron or steel, to that degree desired by the manufacturer.

Now, the object of my improvement in the manufacture of wrought-iron and steel, is providing an easy, cheap, and desirable means for the purifying and refining of all kinds of pig-metal, however and wherever made, and at the same time to facilitate and lessen the cost of manufacturing it into a superior article of wrought-iron or steel.

The nature of my invention consists in bringing melted metal direct from iron-ore, or pig-metal remelted into its most fluid condition, and then purifying and refining it by mixing with it a metallic oxide, and then forming it into plates or bars of wrought-iron, by pouring the molten metal thus purified and refined, and while still in a fluid condition, into moulds formed of a metallic oxide, or moulds coated with a metallic oxide.

To enable others skilled in the art to make and use my invention in the manufacture of iron and steel, I will proceed to describe my method of operation, and the results attained thereby.

I take a good article of iron-ore, and crush or pulverize it, so that it will pass through a "No. 8 sieve."

I then bring the metal direct from the iron-ore, or pig-iron remelted into its most fluid condition, or, as the iron-founders say, "to a milk-white heat," which can be done by a suitable application of heat in a furnace or cupola.

The molten metal is then run into a shank, ladle, or other vessel, which has been coated with a pasty material formed by mixing very finely-pulverized iron-ore and water together, and this coating on the shank, ladle, or vessel, thoroughly dried before the molten iron is run into it, and then mixing into and among the molten metal, the pulverized iron-ore, mixing from eight to twelve pounds of the pulverized ore with about one hundred pounds of the molten cast-iron, taking care to mix thoroughly together the molten iron and pulverized ore, so that the particles of each will come in contact with each other, which mixing may be performed by the use of a suitable tool, by preference made of a flat bar of iron. The lower end of the mixing-tool should be coated with a pasty material formed of the finely-pulverized iron-ore and water, and the coating on the tool should be thoroughly dried before using it.

The pulverized ore may be mixed into and among the molten iron while in the furnace, by having the furnace suitably constructed for that purpose, and by the use of a suitable mixing-tool.

The construction of the furnace and mixing-tool I leave to those skilled in the art.

The pulverized iron-ore should be heated to about 150° Fahrenheit prior to mixing it into and with the molten iron.

After the pulverized iron-ore and molten iron have been mixed together, in the manner and by the means hereinbefore described, the mixed and fluid mass is poured into moulds formed of finely-pulverized iron-ore, which has been so crushed and pulverized that it will pass through a "No. 16 sieve." The crushed and pulverized ore should be moistened, and tempered with water, in the manner practised by "iron-moulders" for tempering and preparing moulding-sand.

After the pulverized ore has thus been prepared, I take a suitable flask, and patterns of the form of the plates or bars desired. With this flask and pattern I form moulds, in and by any of the known means practised by iron-moulders in the foundry; or, I take metallic moulds, of suitable size and form for making the desired plates and bars, and coat the moulds with a pasty material, consisting of finely-pulverized ore and water. The metallic moulds, after being coated, should be thoroughly dried before pouring into them the fluid metal, purified and refined, as hereinbefore described.

I have found, by experience, that one-half inch in thickness for the plates answers best for making a superior article of wrought-iron, and that one inch in diameter is a good size for the bars; but the plates may be made from one to three inches thick, and from five to ten inches wide, and from one to three feet long; and the bars may be made from one to three inches in diameter, and from one to three feet long; and, in every case, a most excellent article of pure and fibrous iron made therefrom.

After the hereinbefore-described purified, refined, and fluid metal has been poured into the moulds, and it has become sufficiently congealed, the plates or bars are then removed from the moulds, and, after being exposed to the action of the atmosphere until they become cold, they are then, in suitable quantities, placed in a puddling or heating-furnace, and properly heated, and worked into balls or piles, which are then hammered, or squeezed and rolled, or otherwise worked and manipulated, in any known manner, for making it or them into any desired form of merchantable iron or steel.

The melted cast-iron may be treated with any suitable "physic," prior to mixing the pulverized iron-ore into and with the fluid metal, and other metallic oxides, alkaline, saline, and carbonaceous matter, may, in limited quantities, be mixed and compounded with the pulverized iron-ore, prior to mixing it with the fluid cast-iron, for purifying and refining it. The operator must always be careful to have the molten cast-iron in its most fluid condition, prior to mixing the pulverized ore into and among it. Otherwise, the operation of purifying and refining it, and pouring it into the moulds, will be imperfectly done.

The operator should always take care to skim the fluid mass, prior to or during the time it is being poured into the moulds. The manner of handling and manipulating the moulds, during the filling and pouring-process, I leave to the judgment and skill of the operator or manufacturer.

I wish it clearly understood that I am aware that pulverized iron-ore, and pulverized iron-ore mixed with other ingredients, have been mixed with molten cast-iron, in the puddling-furnace, and in other ways; therefore, I do not claim, broadly, mixing pulverized ore with molten cast-iron.

I am also aware cast-iron has been run into moulds made in beds of pulverized ore; therefore, I do not claim, broadly, running molten iron into moulds formed of the oxide of iron; but this mixing of the pulverized ore with the molten iron, and the running of the cast-iron into moulds, has been done under other conditions, and with very different results.

The novelty of my process consists in bringing cast-iron into its most fluid condition, and then purifying and refining it, by mixing with it solid oxides, pulverized, and then pouring the purified and refined metal, while still in a melted condition, into moulds, prepared as hereinbefore described, and thereby producing an article of wrought-iron, by my process, which is superior in quality to that obtained in the ordinary way.

Having thus described my improvement,

What I claim as of my invention, is—

1. As a new article of manufacture, plates or bars of wrought-iron, produced by bringing cast-iron into its most fluid condition, and then purifying and refining it, by mixing with it a metallic oxide, and then pouring it, while fluid, into moulds, as hereinbefore described.

2. The production of wrought-iron from cast-iron, by mixing with the latter, while in a fluid condition, a sufficient amount of oxides to purify and refine it, and then pouring the purified and refined metal into moulds, as hereinbefore described.

3. The employment of detersive agents, by mixing them with pulverized iron-ore, to be used in the process hereinbefore described, for the production of wrought-iron.

4. The employment, in the process hereinbefore described, of metallic moulds, coated with a pasty material, consisting of pulverized iron-ore and water.

JAMES J. JOHNSTON.

Witnesses:
JOHN LOCKIE,
JNO. D. PATTEN.